SPIRAL PAGE MOVING MACHINE

Filed Nov. 30, 1960 2 Sheets-Sheet 1

INVENTOR
William Fischer

BY Joseph A. Genovese

ATTORNEY

Dec. 18, 1962 W. FISCHER 3,069,494

SPIRAL PAGE MOVING MACHINE

Filed Nov. 30, 1960 2 Sheets-Sheet 2

INVENTOR
William Fischer

BY Joseph A. Genovese
ATTORNEY

United States Patent Office 3,069,494

Patented Dec. 18, 1962

3,069,494

SPIRAL PAGE MOVING MACHINE

William Fischer, Silver Spring, Md., assignor to Rabinow Engineering Co., Inc., Takoma Park, Md.

Filed Nov. 30, 1960, Ser. No. 72,697
12 Claims. (Cl. 178—7.1)

This invention relates to page moving devices and more particularly to machines for handling sheets in a manner to facilitate high speed scanning of typewritten, printed, etc., material thereon.

Character recognition machines have been developed to the state where the recognition circuits, or the equivalent, are capable of reading at a rate far in excess of the capability of sheet handling devices to present the sheets to the scanner. To my knowledge there has been no new paper handling technique of major significance from the time when practical, high-speed reading machines have become a reality.

Paper collators and drums for supporting a flexible sheet during facsimile transmission and reception are thought to be only remotely connected with the problems encountered in handling sheet material, as a portion of a reading machine system. Although high speed is a requirement for paper collating, and facsimile techniques are presumably satisfactory as far as the speed requirements of sheet handling are concerned, a machine has been constructed wherein the optics and electronics are capable of recognizing alpha-numeric characters at the rate of 2,500 per second. The magnitude of the page handling problem to fully utilize the speed of such a machine is of a completely different order from that encountered in facsimile transmission systems, paper collators or any other page handling devices of which I am aware.

Another requirement peculiar to reading machines is the precision and exactness required of the registration between the view of the scanner and the characters on the sheet. In general, paper collating is indifferent to the printed material (if any) on the sheets, except possibly that the sheets must be in order. Facsimile equipment requires only a reasonable exactness in the positioning of sheets on the facsimile drums. Certainly, the great speeds of reading machines are not involved. A typical page moving machine in accordance with the invention has been constructed to operate at the rate of a sheet change in a sixth of a second.

Accordingly, an object of my invention is to provide a page moving machine which handles pages at a high rate of speed and in a manner suitable for scanning, particularly the scan head of a reading machine.

Reading machine techniques impose a rather severe limitation, as mentioned above, on the positioning of the characters on the sheets with respect to the scanner. To achieve the order of scanning speed sought in reading machine technology, intermittent mechanical movements of the scan head become quite difficult because of the accelerations and decelerations, yet, printed or typewritten material is essentially always in lines. I would like to avoid intermittent motions in the movement of the scan head of optics from one line to the next and also be able to rotate the sheet during scanning.

One of the features of the invention makes it possible to rotate the sheet during reading and avoid intermittent movements of the scan head. To do this, I wrap the paper sheet around the drum in such a manner that the end of the first line of characters is in alignment with the beginning of the second line. Reasonably uniform spacing between lines is found in most typed or printed material, and therefore all other lines on the sheet will be similarly arranged, i.e., the end of one line will be longitudinally aligned with the beginning of the next adjacent line. All of the independent lines on the sheet will then form one continuous helix.

The helical formation of the lines of characters on the sheet will enable the scan head to move in a radial plane of the drum and in a path parallel to the axis of rotation of the drum and at a linear speed synchronized with the rotational speed of the drum, while continuously reading all of the printed material on the sheet.

As stated, it is assumed that all of the lines of characters on the sheet are uniformly spaced. In practice, typewritten material contains only approximate uniformity in line spacing. Accordingly, another object of the invention is to servo the movement of the scanning head to the line by providing slight corrections in the rate of linear movement of the head as the head follows the helix.

It is preferred to have the servo correction in the form of a clockwise or counterclockwise rotational input which adds to or subtracts from the linear speed of the head. One way of accomplishing this is to use a servo motor, and the servo correction signals may be obtained in a number of ways, one of which is disclosed in co-pending application of J. Rabinow, Serial No. 72,702, filed concurrently.

Other objects and features of importance will become apparent in following the description of the illustrated form of the invention. The illustrations are given by way of example only and of course, are not the only way of practicing the invention.

Figures 1, 1A, 1B:
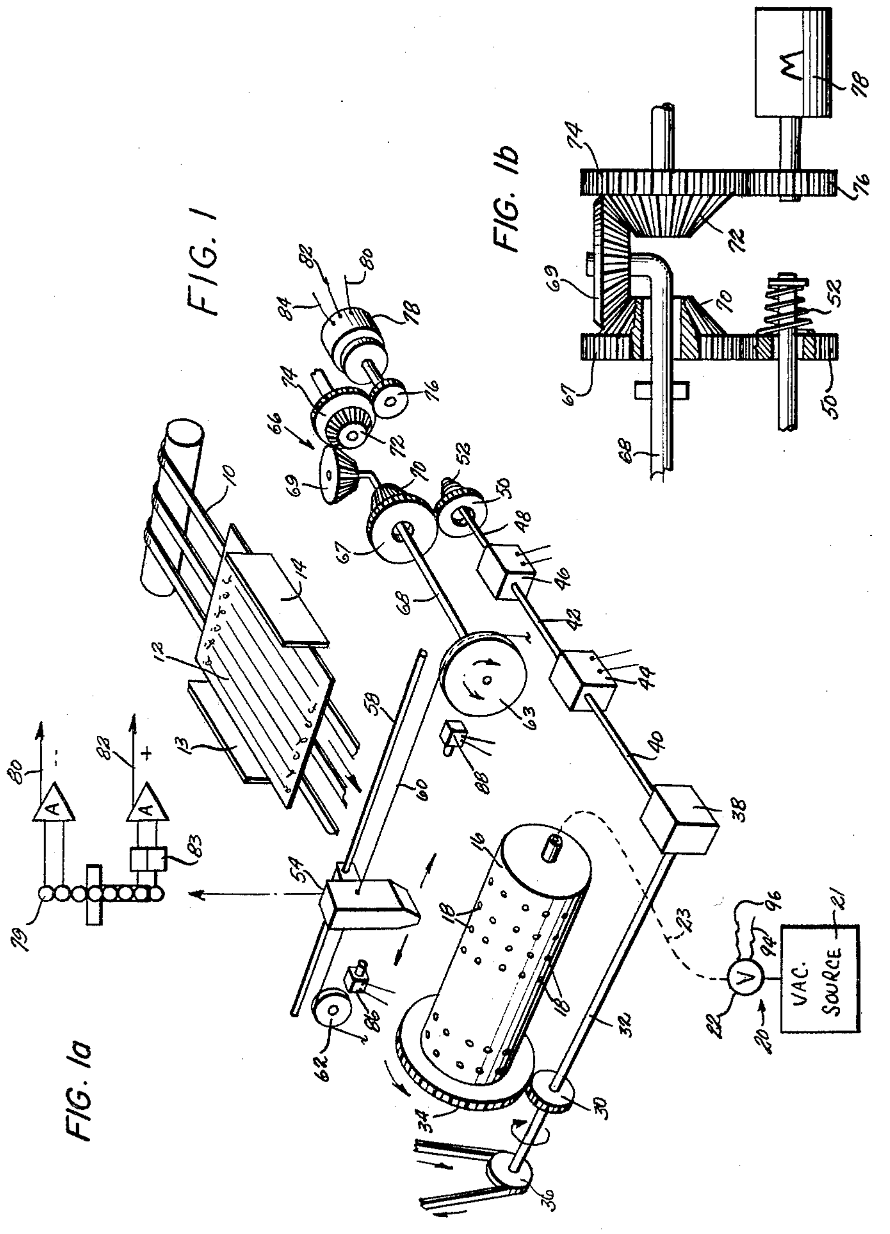
FIGURE 1 is a diagrammatic perspective view showing a page moving machine demonstrating the principles of the invention.
FIGURE 1A is a diagrammatic showing of the scanning head of FIGURE 1.
FIGURE 1B is a sectional view showing a differential.
Figure 2:
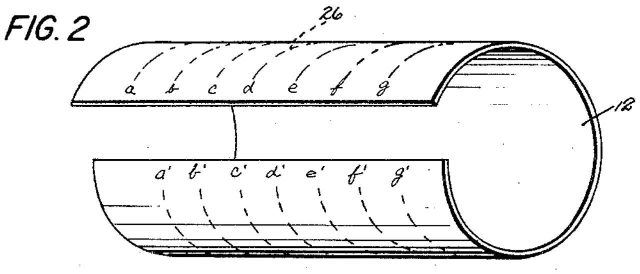
FIGURE 2 is a perspective view showing a typical sheet which is curved approximately as it would appear on the rotary structure in FIGURE 1, in order to register the ends of the respective lines with the beginnings of the next adjacent lines and form a continuous helix from the individual lines of characters on the sheet.

The principle of my invention is shown in FIGURES 1 and 2. The sheet feed mechanism, structural supports, frame and other mechanical parts necessary for completion of the page turning machine and not shown in FIGURE 1, are well known in the art. For example, a commercially available "Multilith" (Addressograph-Multigraph Co.) machine paper feed mechanism, conveyor, controls, etc., was used in a practical embodiment, which incorporated the structural modification shown in FIGURE 1 to convert the "Multilith" to the present helix page moving machine.

Conveyor 10 is shown feeding a typical sheet 12 in the direction of the arrow. A pair of guides 13 and 14 are set at a slight angle at the sides of conveyor 10 in order to skew the approach angle of sheet 12 slightly as it approaches the rotary structure located in advance of the sheet. The rotary structure is preferably a drum 16 which has been made to function as a vacuum drum by perforations 18 and the inclusion of a vacuum system 20. The vacuum system has a vacuum source 21 and vent valve 22 in the line 23 which connects the vacuum source 21 to drum 16 at its axis of rotation by a suitable slip coupling.

The slight approach angle is desirable to obtain the helix 26 made of the discrete lines of characters, when the flexible sheet is adhered to the drum. FIGURE 2 has the lines of characters identified at their beginnings by letters *a, b, c,* etc. The ends of the same lines are identified at *a', b', c',* etc. The end of the first line *a'* becomes aligned with the beginning *b* of the next line, and the end *b'* is aligned with the beginning *c* of the third line, and this progression is carried on for all lines of the sheet. The utility of this feature has been discussed.

Drum 16 is rotated by pinion 30 on shaft 32, the pinion being enmeshed with drum gear 34. Any conventional drive means are used to rotate shaft 32, and these are diagrammatically indicated by pulley 36. A right-angle gear transfer mechanism 38 is attached to shaft 32, and countershaft 40 is driven from mechanism 38. Shaft 40 is coupled to another countershaft 42 by means of an electric clutch 44, and there is an electric brake 46 connected with shaft 42. Shaft 48 (which is a part of shaft 42) extends from brake 46 and has a gear 50 secured to it by means of a slip clutch 52.

Scanning head 54 diagrammatically illustrates any type of scanner, for instance an optical scan device such as disclosed in the J. Rabinow et al. pending application Serial No. 32,911, filed on May 31, 1960. In fact, the present page moving machine is ideally suited for presenting information to the scanner of the reading machine disclosed in that Rabinow et al. pending application.

Scan head 54 is constrained to move in a plane radial to drum 16 by one or more guide rails 58. As drum 16 rotates, scan head 54 is made to traverse near the surface of the drum along a straight line parallel to the axis of the drum.

An elongated flexible drive member, for instance drive tape or belt 60 is attached to head 54 and is constrained by guide pulleys 62 and 63 whose axes are fixed. Drive belt 60 is an endless belt and may be equipped with means to adjust the tension thereof, for instance by having a spring interposed therein.

If helix 26 has a constant pitch from end to end the linear speed of head 54 must be constant. However, if there are deviations in the pitch of the helix 26, the head 54 must be accelerated or decelerated in order to servo the head 54 to the helix at all times. These conditions are fulfilled by driving pulley 63 synchronously with the rotation of drum 16 and applying error corrections to the rotational speed thereof as required. Differential 66 is provided for this purpose. The differential comprises a gear 67 meshed with gear 50 and having an opening through which differential shaft 68 extends. The differential shaft is secured at one end to pulley 63 and has a sun gear 69 mounted on a right angular extension at the opposite end. The sun gear is shown separated from bevel gears 70 and 72 for clarity although in practice the sun gear 69 is always enmeshed with gears 70 and 72. Gear 70 is secured to a face of gear 67, while gear 72 is secured to the confronting face of gear 74, the latter being supported on a fixed axis of rotation. Input gear 76 is enmeshed with gear 74 and is driven by servo motor 78. The inputs to differential 66 are gears 50 and 76 respectively.

Figure 4:
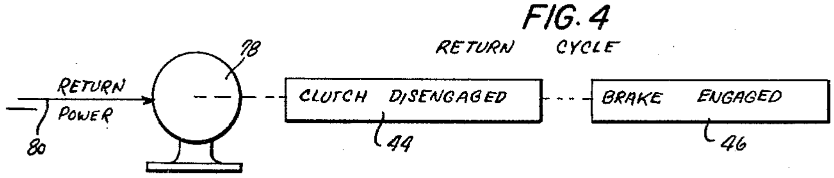
FIGURE 4 is similar to FIGURE 3 but discloses the various conditions of components during the return cycle of the scanner.
Figure 5:
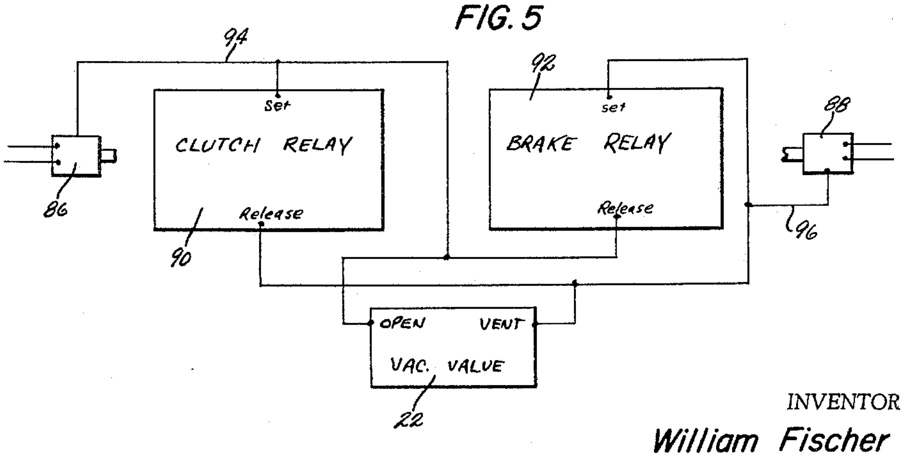
FIGURE 5 is a schematic view showing a portion of the wiring to achieve the brake and clutch positions of FIGURES 3 and 4.

There is a certain operational pattern for clutch 44 and brake 46, however, this will be described subsequently in connection with FIGURES 3–5. To understand the operation of the differential 66, assume that gear 76 is locked which will mean that bevel gear 72 cannot rotate. Shafting 32, 40, 42, and 48 rotates at a speed proportional to the rotation of drum 16 and this rotational movement is imparted to gears 67 and 70. The only movement possible is for sun gear 69 to walk around stationary bevel gear 72 and this will cause shaft 68 and pulley 63 to rotate. It is now evident that the transport for head 54 will operate at a linear speed which is a function of the rotation of drum 16. Assume now that servo correction is required. Electrical signals of the proper sense (plus or minus for a D.C. system) are applied to servo motor 78 causing gear 76 to rotate clockwise or counterclockwise depending on whether the head 54 must be accelerated or decelerated. In either case the gearing 76, 74 and 72 will rotate, either increasing or decreasing (depending on the direction of rotation of gear 72) the speed of motion of sun gear 69.

Pending application U.S. Serial No. 72,702 of J. Rabinow, filed concurrently and entitled "Line Following System for Reading Machine," discloses one means for producing error signals when a scan head is required to be servoed to a line of characters, although for the purposes of my present invention the error signals can be obtained from any source, and another way is shown in FIGURE 1A. A row 79 of photocells forms a part of scan head 54 (for details see copending application Serial No. 32,911), and when the line (represented by one character "T") gets out of registry with the center photocells, error correction signals on lines 80 and 82 are developed. The top section composed of two or more cells produces a negative signal when covered by a character. The same is true of the bottom cells when they are covered. The photocell outputs are amplified, and one is inverted by inverter 83 to obtain the desired polarity.

Figure 3:
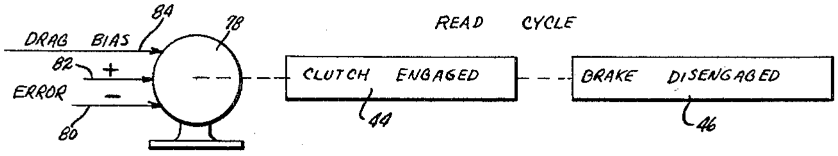
FIGURE 3 is a schematic showing the electrical inputs, and the clutch and brake positions during the read cycle.

Accordingly, servo correction signals are available on lines 80 and 82 (see also FIGURE 3). Secondly, in this description I made the assumption that gear train 72, 74, and 76 was locked when helix 26 was of constant pitch requiring no servo correction. These gears may be locked in a number of ways, one of which is to use an electric brake on the shaft of motor 78 and another is to simply apply bias (diagrammatically indicated by line 84, FIGURE 3) on the motor.

For proper functioning of the head 54 in its linear movement, a particular sequence of operation of clutch 44 and brake 46 is required. When the head moves in one direction this is considered to be the "read cycle" (FIGURE 3) and when the head returns this is considered to be the "return cycle" (FIGURE 4). For the read cycle, clutch 4 must be engaged and brake 46 disengaged so that there is a direct drive from shaft 32 to the differential input gear 50. At this time drag bias is applied to motor 78, and servo correction signals on line 80 or 82 are available when required. For the return cycle (FIGURE 4) clutch 44 is disengaged and brake 46 is engaged. The disengagement of the clutch allows shaft 32 to turn freely relative to shaft 42, and brake 46 holds shaft 48 and gear 50 fixed so that there is no power input from shaft 32 to the differential 66. At this time power is applied to motor 78, for instance an electrical signal on line 80, to cause the power input gear 76 to rotate in a direction to return head 54 to its initial or starting position at a relatively high rate of speed.

Although logic circuits using components in the nature of those disclosed in the J. Rabinow pending application 32,911 are preferred because of their speed and compatibility with reading machine techniques, to show the principle involved in the read and return cycle circuitry, attention is directed to FIGURE 5. Limit switches 86 and 88 are in the path of movement of head 54, and they established the ends of the linear path of travel of the head. Two latching relays 90 and 92 are used, relay 90 being the clutch relay and relay 92 being the brake relay. Conductor 94 is energized when switch 86 is closed, and this sets relay 90 and releases relay 92 thereby engaging clutch 44 and disengaging brake 46 to achieve the read cycle clutch and brake settings (FIGURE 3). When switch 88 is operated the signal on conductor 96 attached to the switch, releases clutch relay 90 and sets brake relay 92 to achieve the return cycle clutch and brake setting (FIGURE 4). Obviously, the relays are directly analogous to logical components such as flip flops.

Vacuum control valve 22 is connected to conductors 94 and 96 so that the vacuum valve opens for the read cycle and vents for the return cycle thereby giving enough time to discharge the old sheet 12 from and deliver a new sheet to the drum during the return movement of head 54. Mechanical clamps may be used to supplement the action of the vacuum for holding the sheet on the drum, and such clamps are part of the "Addressograph" machine which was modified by removing the printing section and equipping the drum 16 to be a vacuum device.

Many modifications, alterations, and other changes may be made without departing from my contribution to this art. Accordingly, limitation should not be imposed, except as required by the prior art.

I claim:

1. In a machine, a detection head for scanning approximately parallel and uniformly spaced separate lines of characters on a flexible sheet, a rotary drum, conveying means to feed successive sheets to the drum surface and to guide each sheet so that the leading edge thereof is at a skew angle to the axis of drum rotation as the sheet approaches the drum, means to hold the sheet wrapped around the drum in such position due to said skew angle that the separate lines form a single helical line around the surface of said drum, drive means for moving said detection head adjacent to said drum and parallel to said drum axis, and said drive means including an error-correction servo mechanism for changing the rate of movement of said head to maintain said head optically aligned with the helical line as said drum rotates and while the line itself is being scanned by said detection head.

2. The machine of claim 1 wherein said drive means include an electric drive motor, and said servo mechanism is drivingly connected with said motor, means to sense a deviation from optical alignment between said line and said head head while said head is scanning the line, said sensing means having means to provide an electrical signal corresponding to said deviation, and means to conduct said signal to said motor as a servo correction signal to bring said head into optical alignment with the helical line through the action of said mechanism.

3. In a flexible sheet handling machine which has a rotary drum and particularly adapted for sheets which have separate lines of intelligence thereon, the improvement comprising conveying means to successively feed the sheets to the drum, and means for skewing each sheet as each sheet approaches the drum so that the ends of the lines of intelligence are aligned with the beginnings of the preceding lines thereby forming a single helix from all of the lines of intelligence when the sheet is rotatably carried by the drum.

4. In a machine for the high speed handling of successive sheets which have separate approximately parallel lines of print thereon, a structure which is rotatable about an axis of rotation, mechanical means to feed successive sheets to the structure, means effective while the sheets are being fed to skew the sheets in a manner that the leading edge of each sheet is at an angle to said axis so that each sheet becomes skewed on the structure with the separate lines of print arranged as a continuous helical line around the surface of said structure, means synchronized with the rotation of said structure for sequentially holding a sheet on said structure and then releasing the sheet, a print detection device mounted adjacent to said rotary structure, and means synchronized with the rotation of said structure for moving said detection device parallel to the axis of said structure to follow said helical line.

5. In a machine for the high speed handling of successive sheets which have separate approximately parallel lines of print thereon, a structure which is rotatable about an axis of rotation, mechanical conveying means to feed successive sheets to the structure with the leading edge of each sheet at an angle to said axis so that each sheet becomes skewed on the structure with the separate lines of print arranged as a continuous helical line around the surface of said structure, means synchronized with the rotation of said structure for sequentially holding a sheet on said structure and then releasing the sheet, a print detection device mounted adjacent to said rotary structure, and means synchronized with the rotation of said structure for moving said detection device parallel to the axis of said structure to follow said helical line, said detection device moving means including a servo mechanism to correct the position of said device with respect to said helical line by selectively accelerating and decelerating said detection device as it is moved by said moving means to follow said helical line.

6. In a machine for handling sheets having lines thereon, a drum rotatable about an axis, means to releasably retain individual successive sheets on the drum as said drum rotates, a detection device, means mounting said detection device adjacent to said drum, means for moving said device in a plane parallel to said axis of rotation so that said device follows successive lines on the sheet retained on the drum as the drum rotates, and servo control means operatively connected with said device moving means to servo said device to the line while the device is following the line by changing the speed of said detection device.

7. The subject matter of claim 6 wherein said servo control means include photosensitive means to examine the line and provide electrical signals indicative of a deviation of said device from optical alignment with the line, and said device-moving means being responsive to said electrical signals.

8. In an optical character recognition machine which requires a scanner, a combined reading-machine scanner and high-speed sheet handling apparatus for sheets having approximately parallel lines of print, said apparatus including a rotary structure to hold and rotate a sheet to provide one component of scan motion, means mounting said scanner for movement in a direction parallel to the axis of rotation of said structure to provide a second component of scan motion, conveying means to feed successive sheets to said structure, means to hold each sheet on said structure while the sheet is rotated with the structure and then release the sheet, means connected with said scanner to move said scanner to provide said second component of scan motion while a sheet is on said structure, means to sense the position of the print of the line being scanned relative to said scanner while it is being scanned and provide corresponding electrical signals which correspond to scanner-to-line misalignment, and means responsive to the electrical signals for correcting said misalignment while the line is being scanned by adjusting the speed of said scanner.

9. The subject matter of claim 8 and mechanical means to skew the sheets as they approach said rotary structure, to an angle such that the beginnings and ends of successive lines of print are coextensive and the individual lines thereby become arranged as a single helical line when the sheet is on and rotated by said structure.

10. In a reading machine for characters that are formed in approximately parallel lines on a sheet with spaces between the lines, and where the reading machine requires a scanner, the improvement comprising a rotary structure to hold the sheet, means to feed the sheet to the rotary structure at a predetermined angle to the axis of said rotary structure, means operatively associated with said structure for holding the sheet on the structure in such position that the end of each line is colinear with the beginning of the next adjacent line so that the lines form a helical line of characters, a scanner, means mounting said scanner for movement along said axis of said rotary structure, and means synchronized with the rotation of said structure to move said scanner at a speed relative to said structure so that said helical line is examined by said scanner to the exclusion of the space between adjacent portions of the helical line.

11. The subject matter of claim 10 and servo means operative while said helical line is being examined by said scanner and responsive to deviations of optical alignment between said scanner and said helical line to servo said scanner to said helical line.

12. The subject matter of claim 11 wherein said servo means include a mechanism for adjusting the rate of movement of said scanner.

References Cited in the file of this patent

UNITED STATES PATENTS

| | | |
|---|---|---|
| 1,783,093 | Molins | Nov. 25, 1930 |
| 2,210,706 | Carlisle | Aug. 6, 1940 |

FOREIGN PATENTS

| | | |
|---|---|---|
| 788,862 | Great Britain | June 8, 1958 |
| 816,825 | Great Britain | July 22, 1959 |
| 816,826 | Great Britain | July 22, 1959 |